US012783977B2

(12) United States Patent
Harris

(10) Patent No.: US 12,783,977 B2
(45) Date of Patent: Nov. 3, 2026

(54) ARTIFICIAL INTELLIGENCE ASSISTED METHOD FOR MEASURING AND QUANTIFYING PHYSICAL EFFORT, COGNITIVE EFFORT, AND SENTIMENT WHILE PERFORMING A TASK

(71) Applicant: Christopher John Harris, Potlatch, ID (US)

(72) Inventor: Christopher John Harris, Potlatch, ID (US)

( * ) Notice: Subject to any disclaimer, the term of this patent is extended or adjusted under 35 U.S.C. 154(b) by 0 days.

(21) Appl. No.: 18/892,351

(22) Filed: Sep. 21, 2024

(65) Prior Publication Data

US 2026/0170426 A1 Jun. 18, 2026

(51) Int. Cl.
*G06Q 10/00* (2026.01)
*G06Q 10/0631* (2023.01)

(52) U.S. Cl.
CPC .............................. *G06Q 10/06312* (2013.01)

(58) Field of Classification Search
None
See application file for complete search history.

(56) References Cited

U.S. PATENT DOCUMENTS

| | | | | |
|---|---|---|---|---|
| 2025/0017535 | A1* | 1/2025 | Truong | A61B 5/4088 |
| 2026/0004155 | A1* | 1/2026 | Gehtman | G06N 5/02 |
| 2026/0013763 | A1* | 1/2026 | Mudholkar | A61B 5/165 |
| 2026/0030643 | A1* | 1/2026 | Sharma | G06F 40/40 |

OTHER PUBLICATIONS

A. Batch, Y. Ji, M. Fan, J. Zhao and N. Elmqvist, "uxSense: Supporting User Experience Analysis with Visualization and Computer Vision," in IEEE Transactions on Visualization and Computer Graphics, vol. 30, No. 7, pp. 3841-3856, Jul. 2024 (Year: 2024).*

* cited by examiner

*Primary Examiner* — Matheus Ribeiro Stivaletti

(57) ABSTRACT

An AI-assisted method and system for comprehensively measuring and quantifying physical effort, cognitive effort, and sentiment during task performance. The invention utilizes multi-modal video analysis, including screen capture, audio, and webcam recordings, to detect and measure various effort metrics. Unique aspects include the fusion of physical and cognitive effort measurements, sentiment analysis, and the ability to compare task performance across different approaches or platforms. The system generates detailed reports for optimizing user experiences and workflows.

22 Claims, 2 Drawing Sheets

Artificial Intelligence Assisted Method for Measuring and Quantifying Physical Effort, Cognitive Effort, and Sentiment While Performing a Task Artificial Intelligence Assisted Method for Measuring and Quantifying Physical Effort, Cognitive Effort, and Sentiment While Performing a Task

ARTIFICIAL INTELLIGENCE ASSISTED METHOD FOR MEASURING AND QUANTIFYING PHYSICAL EFFORT, COGNITIVE EFFORT, AND SENTIMENT WHILE PERFORMING A TASK

FIELD OF THE INVENTION

The present invention relates to user experience analytics, and more particularly to methods for quantifying the experience with the help of artificial assistance.

BACKGROUND OF THE INVENTION

Existing systems for measuring task effort are limited in scope, often focusing solely on web interactions or requiring specific operating systems. They fail to capture the full spectrum of physical and cognitive effort, particularly across diverse applications and platforms. Furthermore, current solutions lack the ability to analyze user sentiment in conjunction with effort metrics. This invention addresses these limitations by providing a comprehensive, platform-agnostic approach to effort and sentiment analysis.

SUMMARY OF THE INVENTION

The present invention provides several key advancements:

1. Multi-modal analysis: By combining screen capture, audio, and webcam data, the system provides a holistic view of user effort and sentiment.
2. AI-driven measurement: Advanced AI models detect and quantify both physical and cognitive effort metrics, providing unprecedented insight into task complexity.
3. Platform agnosticism: Unlike existing solutions, this system can analyze tasks performed on any operating system or application.
4. Sentiment integration: The invention uniquely incorporates sentiment analysis into effort measurement, providing a more complete picture of user experience.
5. Comparative analysis: The system enables direct comparison of effort and sentiment across different task approaches or competitive solutions.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF THE INVENTION

1. Architecture

One embodiment architecture has separate client and server applications or processes where the client includes an application or operating system feature on the computing device being observed to make a video recording of a screen capture that may additionally include audio capture and webcam capture. The application can be a third-party application making video recordings of screen captures or a first party application with some or all the following features: install the necessary agent or agents, facilitate the capture of all relevant data, automate the upload of the video recording and other relevant data, automatically filter or mask personally identifiable information or other sensitive information, display and facilitate the analysis of effort and sentiment reports. In this embodiment a separate server architecture is responsible for performing the effort and sentiment analysis of the video recording and generating the effort and sentiment report and a website, file share or other means is used to submit the video recording for analysis. In this embodiment there may also be a website or other application to display the report and facilitate analysis.

Another embodiment architecture combines the client and server architecture into a first party application or suite of applications that performs multiple of the following: make a video recording of the screen capture that may additionally include audio capture and webcam capture, perform the effort and sentiment analysis of the video recording, generate the effort and sentiment report, display the report and facilitate analysis.

Figure 3:
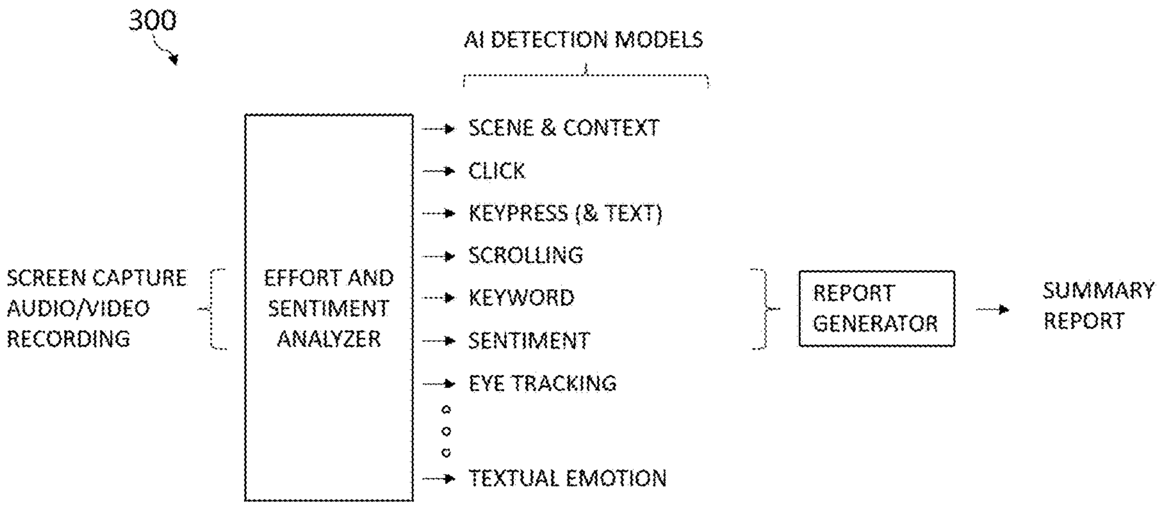
FIG. 3 illustrates a diagram of an embodiment method for analyzing effort and sentiment.

In both embodiments the effort and sentiment analysis of the video recording is performed by an effort and sentiment analyzer as seen in FIG. 3. The effort and sentiment analyzer determines which types of analyses are required based on configuration provided by the user and uses the appropriate AI models to perform the required analyses. The effort and sentiment analyzer then passes the results along with any provided measures log data to the Report Generator where the results are combined into summary report.

2. Step-by-Step Workflow

Analysis Method 1: Artificial Intelligence only

Figure 2:
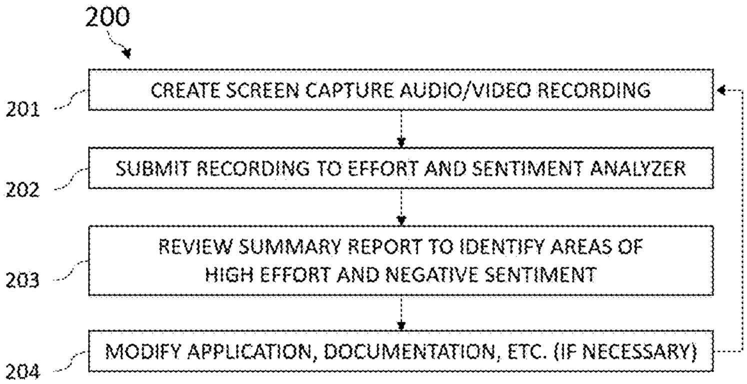
FIG. 2 illustrates a diagram of an embodiment workflow that someone analyzing effort and sentiment might follow.

1. In one embodiment as indicated in FIG. 2, at step 201 a screen capture video recording is created of someone performing a task, with or without audio.
2. At step 202 the video recording (.mp4 or other video format) is submitted to the Effort and Sentiment Analyzer (Analyzer) along with configuration describing which types of analyses are to be performed where the Analyzer determines from the configuration which types of analyses are to be performed and submits the screen capture to one or more AI models to be analyzed.

Each AI model performs its specialized analysis (e.g., clicks, keypresses, scrolls, words, context switches, concepts, choices, sentiment, etc.) and returns the results of the analysis to the Analyzer.

The Analyzer aggregates the results and submits them to the report generator.

The report generator creates a summary report detailing all the effort measures and highlighting areas of high effort and negative sentiment. The report includes timestamps with links that allow a person viewing the report to jump to the relevant point in the video recording to gain a deeper understanding.

The measures are also stored in a database to enable comparisons of the effort required between different tasks, the same task being performed by different people, or the same task being performed using different approaches.

3. At step 203 the person analyzing the effort and sentiment reviews the report to identify areas of high effort and negative sentiment where the experience can be improved.
4. At step 204 improvements are made to the product or solution to reduce the effort and/or improve the sentiment and the product or solution is ready to be evaluated again beginning with step 201.

Analysis Method 2: Artificial Intelligence+Visible Agent

This method is like Method 1, with the addition of a step prior to 201 where an Agent is installed to collect measures from the operating system and applications natively and display them on screen to be recorded in the screen capture where they can be analyzed by the AI. The agent is also used to calibrate for eye tracking. This method both enhances the AI Only method's accuracy and facilitates training new AI models.

Analysis Method 3: Artificial Intelligence+Hidden Agent

This method is like Method 1, with the addition of a step prior to 201 where an Agent is installed to collect measures from the operating system and applications natively. But rather than having those measures captured in the video recording, the measures are collected in a measures log file, which is submitted to the Analyzer to be analyzed along with the video recording in step 202. This measures log file includes timestamps for each measure captured to enable direct correlation with the measures detected in the video recording. The agent is also used to calibrate for eye tracking. This method both enhances the AI Only method's accuracy and facilitates training new AI models.

3. Specific Use Cases or Examples to Illustrate the Invention's Functionality.

Use Case 1: Basic Analysis

In one embodiment of the method a user may perform an analysis to identify areas of potential improvement. This use case is shown in FIG. 2 without the loop from step 204 to step 201.

Use Case 2: Improvement Analysis

In one embodiment of the method a user may perform an analysis to identify areas of potential improvement, make changes, then perform another analysis and compare the analyses to determine whether the changes reduced the effort and/or improved the sentiment.

Use Case 3: Approach Comparison Analysis

In one embodiment of the method a user may identify multiple approaches for completing the same task, perform an analysis of each approach, and compare the analyses.

Use Case 4: Competitive Comparison Analysis

In one embodiment of the method a user may perform an analysis of completing a task for one company's product or solution and perform an analysis of completing the same or similar task for one or more other company's products or solutions, and then compare the analyses.

4. Effort and Sentiment Measurement Algorithms and Data Formats

Time—Time is a measure of effort that is calculated as the number of seconds it takes to complete an entire task, or a sub-task. Time is measured by comparing the timestamps at the beginning and end of the task. The simplest measure is the start and end of the video recording, assuming the recording marks the beginning and end of the task.

Audio analysis can identify key words or phrases such as "let's get started", "done", "on to the next part", etc. to better determine the timestamps representing the start and end of tasks and sub-tasks.

Context switches can be used to determine the start and end of tasks and sub-tasks when a user navigates to another page in a set of instructions, or to a new set of instructions.

Eye tracking can be used to determine the start and end of tasks and sub-tasks when a user's attention is focused on a new section in a set of instructions, or to a new set of instructions.

Clicks—Clicks are a measure of physical effort that include clicking a button or switch on a mouse or touchpad, tapping a screen or a touchpad, making a physical or facial movement that is detected by the computing device and interpreted as a click, or using one or more keys to activate a button on the screen such as "Submit", "Next", etc. Each click is counted and associated with a timestamp and a control and/or location on screen. The click detection AI model is trained to detect the changes or effects that occur when a click is performed. When the agent is used, the agent can detect clicks through interaction with the operating system and the two sets of context switch data are aggregated by timestamp.

Example Click Data:

```
clicks:
  - id: "1"
    timestamp: "00:20:30.1001"
    type: "single-click"
    location:
      x: "329"
      y: "849"
    context:
      window: "Chrome Browser"
      path: "Address Bar"
      target: "Submit button"
  - id: "2"
    timestamp: "00:20:38.1002"
    type: "tap"
    location:
      x: "642"
      y: "392"
    context:
      window: "File Explorer"
      path: "This PC/Local Disk (C:)/Users/John Doe/Downloads"
      target: "New Text Document.txt"
```

Keypresses—Keypresses are a measure of physical effort that include pressing a key on a physical, on-screen or virtual keyboard by hand, mouse, or any other means. Each keypress is counted, and they are grouped based on pauses between sets of keypresses. Keypresses are detected by the keypress AI model trained to detect the changes that occur when a keypress is performed. When the agent is used, the agent also detects keypresses through interaction with the operating system and the two sets of keypress data are aggregated by timestamp.

Example Keypress Data:

```
keypresses:
  - id: "1"
    timestamp: "00:20:30.1001"
    type: "combination"
    count: "2"
    keys:
      - "alt"
      - "s"
    location:
      x: "329"
      y: "849"
```

-continued

```
    context:
      window: "Chrome Browser"
      path: "Address Bar"
      target: "Submit button"
  - id: "2"
    timestamp: "00:20:38.1002"
    type: "single"
    count: "1"
    keys: "enter"
    location:
      x: "642"
      y: "392"
    context:
      window: "File Explorer"
      path: "This PC/Local Disk (C:)/Users/John Doe/Downloads"
      target: "New Text Document.txt"
  - id: "3"
    timestamp: "00:21:12.1004"
    type: "multiple"
    count: "42"
    keys: "The quick brown fox jumps over the lazy dog."
    location:
      x: "223"
      y: "197"
    context:
      window: "Notepad"
      path: "Filename.txt"
      target: "Text area"
```

Scrolls—Scrolls are a measure of physical effort that include causing a portion of an application, list of items or another element to move horizontally, vertically, zoom in, zoom out, etc. Scrolls are typically performed with a wheel or other sensor on a mouse, a gesture on a touchpad or screen, tilting of a device, turning a dial or nob, making a physical or facial movement that is detected by the computing device and interpreted as a command scroll, or using one or more keys to cause the movement. Each scroll measure includes a measure of contextual distance travelled (e.g., lines in a document, cells in a spreadsheet, items in a list, etc.) The scroll detection AI model is trained to detect the motion that occurs when a scrolling motion or action is performed. When the agent is used, the agent can detect scrolls through interaction with the operating system and the two sets of scroll data are aggregated by timestamp.

Example of Scroll Data:

```
scrolls:
  - id: "1"
    timestamp: "00:20:30.1001"
    type: "vertical"
    detection: "AI"
    context:
      window: "Chrome Browser"
      tab_title: "Bing"
      url: "https://www.bing.com/"
    lines: "23"
    percent: "10.3"
  - id: "2"
    timestamp: "00:20:38.1002"
    type: "zoom_in"
    detection: "OS"
    method: "pinch"
    context:
      window: "Chrome Browser"
      tab_title: "How to copy a file in PowerShell - Stack Overflow"
      url: "https://stackoverflow.com/questions/24219029/how-to-copy-a-file-in-
powershell"
    percent: "33"
```

Words—Words are a measure of physical effort that includes speaking to a device with the expectation that a task or a step in a task will be completed. The audio recording will be transcribed, and the transcription will be analyzed by a specialized AI model to identify spoken commands, responses to questions, etc.

Example of Words Data:

```
words:
  - id: "1"
    timestamp: "00:20:30.1001"
    type: "command"
    wake_word: "hey homebody"
    words: "Turn the air conditioner on."
  - id: "2"
    timestamp: "00:20:38.1002"
    type: "command"
    wake_word: "ok jarvis"
    words: "write an email to John, explaining why the project is too
expensive to continue."
  - id: "3"
    timestamp: "00:21:12.1004"
    type: "response"
    words: "72 degrees"
    prompt: "What would you like me to set the temperature to?"
```

Context switches—Context changes are a measure of cognitive effort that include changing focus from one window, website, application or area of an application to another. This often occurs during task completion when a person changes their focus from a set of instructions to the application such as a browser, terminal, development tool, etc, where they are performing tasks to follow the instructions. Context switches are detected in several ways: a new window becomes the active window; a click, keystroke, scroll, etc. occurs in the new area of context; eye tracking detects that the user has focused their attention in the new area of context. When the agent is used, the agent can detect context switches through interaction with the operating system and the two sets of context switch data are aggregated by timestamp.

Example of Context Switch Data:

```
context_switches:
  - id: "1"
    timestamp: "00:20:30.1001"
    detection: "active-window-change"
    context:
      window: "Chrome Browser"
      type: "browser"
      tab_title: "Bing"
      url: "https://www.bing.com/"
  - id: "2"
    timestamp: "00:20:40.1002"
    detection: "tab-change"
    context:
      window: "Chrome Browser"
      type: "browser"
      tab_title: "How to copy a file in PowerShell - Stack Overflow"
      url: "https://stackoverflow.com/questions/24219029/how-to-copy-a-file-in-
powershell"
  - id: "3"
    timestamp: "00:20:50.1003"
    detection: "active-window-change"
    context:
      window: "PowerShell"
      type: "terminal"
  - id: "4"
    timestamp: "00:21:00.1004"
    detection: "eye-focus-change"
    context:
      window: "Chrome Browser"
      type: "browser"
      tab_title: "How to copy a file in PowerShell - Stack Overflow"
      url: "https://stackoverflow.com/questions/24219029/how-to-copy-a-file-in-
powershell"
  - id: "5"
    timestamp: "00:21:10.1005"
    detection: "click-detection-change"
    context:
      window: "PowerShell"
      type: "terminal"
```

Concepts—Concepts are a measure of cognitive effort that include domain specific words or ideas the person completing a task may have little to no familiarity with. The lack of unfamiliarity increases the cognitive effort of a task because often the person completing the task must slow down and reason about an unfamiliar word, read the instructions or the interface more carefully, or look up the word to proceed with confidence. For example, a developer who is familiar with cloud computing on one platform may be unfamiliar with the terminology used to describe similar capabilities and features on another platform. For another example, a developer who has not yet built applications with AI may be unfamiliar with the many terms used such as vector, embedding, prompt, etc. in the context of AI applications.

Concepts may be detected through one or more of the following means:

Perform optical character recognition (OCR) of the video recording to convert words on the screen to text and use an AI model trained to identify domain specific words and advanced concepts. Optionally, compare the concepts against a list of concepts believed to be new for people unfamiliar with the task being performed.

Use a form recognizer type of AI model to extract URLs or other identifiers from the video recording, then query the URL or other identifiers and use an AI model trained to identify domain specific words and advanced concepts. Optionally, compare the concepts against a list of concepts believed to be new for people unfamiliar with the task being performed.

Perform sentiment analysis of the audio and webcam portions of the video recording to identify scenes where the person completing the task is confused, frustrated, etc. and the concepts that are the target of the confusion, frustration, etc.

Perform sentiment analysis of the audio and webcam portions of the video recording to identify scenes where the person completing the task is confused, frustrated, etc. and use the timestamp to correlate to concepts in the text that are visible at the same time.

Example of Concept Data:

```
concepts:
  - id: "1"
    timestamp: "00:20:30.1001"
    concept: "vector database"
    location:
      source: "URI analysis"
```

-continued

```
      context:
        window: "Chrome Browser"
        path: "https://cloud.charristech.com/solutions/using-vectors-to-analyze-geospatial-data"
        area: "Body"
        heading: "Storage"
  - id: "2"
      timestamp: "00:20:38.1002"
      concept: "role based access control"
      source:
        type: "OCR"
        location:
          x: "642"
          y: "392"
      context:
        window: "Chrome Browser"
        path: "https://cloud.charristech.com/solutions/managing-access-to-data"
        heading: "RBAC"
  - id: "3"
      timestamp: "00:21:12.1004"
      concept: "Table of Authorities"
      source:
        type: "eye_tracking"
          location:
            x: "123"
            y: "456"
        type: "verbal_sentiment"
          sentiment: "confusion"
      context:
        window: "Word"
        path: "AI Assisted Task Effort and Sentiment Analysis Measurement"
```

Choices—Choices are a measure of cognitive effort representing the number of options a person must decide between while completing a task. For example, if a person deploying a web application is given the choice between two web frameworks for the front-end application, or the choice to deploy the application to locations A, B, C, and D, there is cognitive effort required to understand enough about the options to make a choice they feel comfortable. The more options given the more effort required.

Choices may be detected through one or more of the following means:

Perform optical character recognition (OCR) of the video recording to convert words on the screen to text and use an AI model trained to identify choices in text or user interface like radio buttons or a dropdown on a web page or an application, a list of options in a terminal window, etc.

Use a form recognizer type of AI model to extract URLs or other identifiers from the video recording, then query the URL or other identifiers and use an AI model trained to identify choices in text.

Example of Concept Data:

```
choices:
  - id: "1"
      timestamp: "00:20:30.1001"
      duration: "00:00:08.0001"
      prompt: "Which Python web framework would you like to use?"
      options:
        1: "HTMX"
        2: "Django"
        3: "Flask"
        4: "FastAPI"
        5: "Streamlit"
      context:
        window: "Chrome Browser"
        path: "https://cloud.charristech.com/quickstart/deploy-a-python-web-app"
        area: "Body"
        heading: "Web Framework"
  - id: "2"
      timestamp: "00:20:38.1002"
      duration: "00:00:04:0321"
      prompt: "Where would you like to deploy your application?"
      options:
        1: "US East"
        2: "US West"
        3: "Canada East"
        4: "Canada West"
        5: "Mexico"
```

-continued

```
    context:
      window: "Terminal"
      heading: "PowerShell"
  - id: "3"
    timestamp: "00:28:12.1003"
    duration: "00:00:16:6287"
    prompt: ""
    options:
      1: "Settings"
      2: "Keyboard Shortcuts"
      3: "User Snippets"
      4: "User Tasks"
      5: "UI State"
      6: "Extensions"
      7: "Profiles"
    context:
      window: "Visual Studio Code"
      heading: "Settings Sync"
```

Sentiment—Sentiment is a measure of cognitive effort representing the way a person feels during various steps while completing a task. For example, if a person expresses frustration, anger, or uncertainty it is an indicator of higher effort than if a person expresses neutral sentiment or positive sentiment like delight, enthusiasm, wonder. Sentiment will be detected and measured by either existing sentiment analysis models or by developing new, specialized models to better fit the requirements of measuring effort.

Example of Sentiment Data:

```
choices:
  - id: "1"
    timestamp: "00:20:30.1001"
    duration: "00:00:01.0001"
    detection: "audio"
    phrase: "Wow! I love this!"
    sentiment: "positive"
    context:
      window: "Chrome Browser"
      path: "https://cloud.charristech.com/quickstart/deploy-a-python-web-app"
      area: "Body"
      heading: "Web Framework"
  - id: "2"
    timestamp: "00:20:38.1002"
    duration: "00:00:2.0631"
    detection: "visual"
    gesture: "face palm"
    sentiment: "negative"
    context:
      window: "Terminal"
      heading: "PowerShell"
  - id: "3"
    timestamp: "00:28:12.1003"
    duration: "00:00:03.3974"
    detection: "textual"
    text: "Why can't I deploy this stupid thing?"
    sentiment: "negative"
    context:
      window: "Chrome Browser"
      path: "https://search.charristech.com/"
      heading: "Search"
```

Effort Score—Effort score is the aggregate of all other measures into a single number. The lowest number is 1, which would occur if pushing a single button or saying a single phrase accomplished the task. The various measures will have a weighting factor so that measures like clicks do not carry the same weight as a concept which may be very difficult to understand. Observers are allowed to adjust the weighting given to each measure in a task.

ENABLEMENT

The present invention is enabled by applying artificial intelligence (AI) models and techniques to analyze video recordings of users performing tasks to detect and measure various physical and cognitive effort metrics. The key enablers are:

1. Video Capture

The invention is enabled by recording video that captures the user's interactions with a computing device while performing a task. This video recording includes screen capture showing the user interface and any applications/windows involved in the task. It also includes audio capture of any words spoken by the user, and webcam capture of the user's face/body language.

2. AI Models for Physical Effort Detection

Detecting and measuring physical interactions like clicks, keystrokes, scrolls, and spoken words is enabled by using computer vision AI models. These models are trained on sample video data to recognize the visual changes, motions, and audible signals associated with each physical action of interest.

3. AI Models for Cognitive Effort Detection

Detecting higher-level cognitive factors like context switches, identifying advanced concepts/terminology, recognizing presented choices, and analyzing user sentiment is enabled by a combination of computer vision, optical character recognition (OCR), natural language processing (NLP), and speech recognition AI models and techniques.

4. System Instrumentation (Optional)

To further enhance accuracy, the invention can be enabled by installing monitoring software/agents on the user's computing device. This allows direct collection of system information about interactions like window focus changes, application events, text inputs, etc. which can supplement the video analysis.

5. Report Generation

Summarizing the analyzed physical and cognitive effort metadata in a comprehensive report is enabled by quantifying and aggregating the output data from the AI models into relevant metrics and scores. Visualization and comparison features allow insights into high-effort areas.

The specification provides multiple embodiments, example implementations, data formats, and workflows to enable practitioners to utilize the AI-assisted effort and sentiment measurement techniques across diverse use cases like application usability testing, process optimization, and product experience benchmarking.

Practitioners skilled in the arts of computer vision, natural language AI, data visualization and software instrumentation can reproduce the invention by leveraging the detailed disclosure along with commonly available model training data, computing resources and AI development tools and frameworks.

The breadth of techniques described, ranging from basic video analysis to advanced multimodal AI fusion with system telemetry, provides flexibility to implement the invention at different scalability and fidelity levels as per project requirements and resource constraints.

In summary, the invention is well enabled by the state-of-the-art in AI models for perception and cognition tasks, applied innovatively to address the problem of comprehensively measuring user effort and experience during software/device interaction.

BEST MODE FOR CARRYING OUT THE INVENTION

Figure 1:
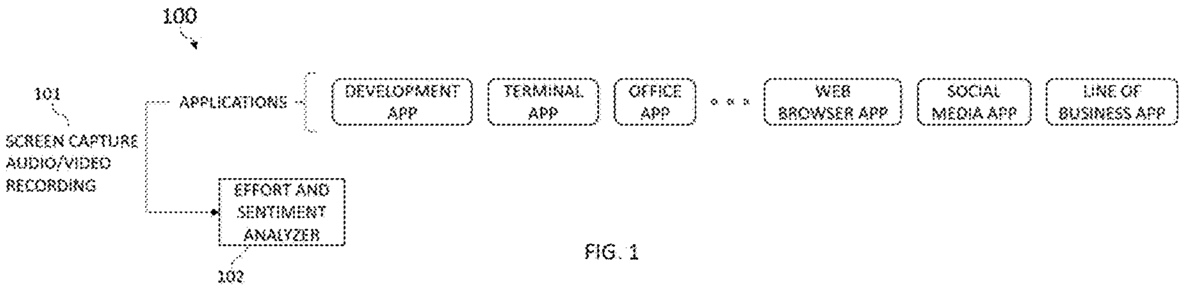
FIG. 1 illustrates a diagram of an embodiment architecture of a computing device.

The best mode contemplated by the inventor for carrying out this invention is as follows:

The process begins by recording a multi-modal video capture 110 of the user 102 interacting with a computing device 104 while performing a target task or workflow. As shown in FIG. 1, the video capture comprises:

1) A screen capture recording showing the user interface, applications, and on-screen elements visible to the user 102 on the computing device 104 display.
2) An audio recording capturing any words or sounds spoken/made by the user 102 during the task.
3) A webcam recording capturing video of the user's 102 face, eye movements, gestures and body language during the task.

The computing device 104 can be a laptop, desktop, mobile device, virtual/augmented/mixed reality system or any other device with display capabilities. It can run any operating system platform like Windows, MacOS, IOS, Android etc.

The recorded multi-modal video capture 110 is then transmitted over a network 112 and submitted to an Effort and Sentiment Analysis Engine 120 running on remote server infrastructure 122, separate from the user's computing device 104.

The Analysis Engine 120 processes the submitted video capture 110 using a suite of artificial intelligence (AI) models 124 designed for detecting and measuring various physical and cognitive effort indicators from the multi-modal inputs.

The AI models 124 employ state-of-the-art deep learning architectures. For computer vision tasks, convolutional neural networks (CNNs) may be utilized. Natural language processing leverages transformer-based models like BERT or GPT. Sentiment analysis combines both visual and textual inputs through multi-modal fusion techniques. These models are trained on large, diverse datasets of task performances to ensure robust detection across various scenarios and user types.

Inputs include but are not limited to:

Computer vision models for detecting user physical interactions like mouse clicks, keyboard strokes, scrolling, etc.

Speech recognition models for detecting spoken words or commands

Natural language processing models for analyzing text from speech-to-text or optical character recognition to identify high-level concepts, choices presented, user questions/responses Facial analysis and gesture recognition models for detecting user emotions and sentiment Eye tracking models for determining user focus areas The Analysis Engine 120 fuses the output from all the AI models 124 analyzing the multi-modal video inputs to generate comprehensive effort and sentiment metadata 126 quantifying how much physical and cognitive effort the user experienced at each step of the task.

This metadata 126 is then passed to a Report Generator module 130, which compiles it into an interactive summary report 132 that visualizes the degree of physical and cognitive effort compared across different sections of the task workflow. Areas of high effort or user frustration are highlighted for targeted optimization.

The report 132 is made available to subject matter experts, application/product designers or developers for review. Based on the findings, they can ideate and implement improvements 134 to the task workflow, user interface, product design, instructional guidance or other relevant areas.

To validate if the improvements 134 were effective, the entire process can be repeated cyclically with the user 102 performing the improved task or workflow. The new multi-modal recording is submitted for analysis, and the updated summary report can be compared to the previous report to quantify if high effort or frustration areas were successfully reduced, and to identify any remaining areas that still need optimization.

This cyclical process of recording, analysis, reviewing reports, implementing improvements, and repeating with validation forms the best mode of practicing the present invention in a comprehensive manner.

The level of multi-modal recording fidelity, range of AI models utilized, and sophistication of the effort/sentiment analysis can be scaled up or down as required based on available computing resources, development expertise and implementation constraints. However, the inventor has determined that for maximally robust, accurate and insightful measurement of user effort and experience, the best mode is to leverage all three modes of video/sensor capture and perform multi-modal analysis using a wide range of AI model types.

What is claimed is:

1. A computer-implemented method for measuring effort and sentiment associated with performing a task, the method comprising:

recording a multi-modal video recording of a user interface while a user performs the task on a computing device, wherein the multi-modal video recording comprises a synchronized combination of a screen capture of the user interface, audio capture of sounds made by the user, and webcam capture of the user's face and body language;

submitting the recorded multi-modal video recording to an effort and sentiment analyzer implemented by one or more servers remote from the computing device;

analyzing, by the effort and sentiment analyzer using one or more artificial intelligence models comprising at least one computer-vision model trained to detect visual changes indicative of a physical action, the multi-modal video recording to detect and measure physical effort metrics including clicks, keystrokes, scrolls, and words spoken;

analyzing, by the effort and sentiment analyzer using a plurality of artificial intelligence models comprising an optical character recognition model that extracts text from the screen capture, a natural language processing model that processes the extracted text, a speech recognition model that transcribes the audio capture, and a multi-modal sentiment fusion model that combines visual features extracted from the webcam capture with textual features derived from at least one of the audio capture and the screen capture, the multi-modal video recording to detect and measure cognitive effort metrics including context switches, advanced concepts, choices presented, and user sentiment;

generating an interactive report summarizing the detected and measured physical and cognitive effort metrics, the interactive report including, for each of a plurality of the detected metrics, a timestamp and a link that, when activated, causes playback of the multi-modal video recording to jump to a corresponding point in the multi-modal video recording.

2. The method of claim 1, further comprising: installing an agent on the computing device to collect physical and cognitive effort measures through interaction with an operating system and applications; submitting the collected effort measures along with the video to the effort and sentiment analyzer to enhance the analysis.

3. The method of claim 1, wherein analyzing the video to detect advanced concepts comprises: performing optical character recognition on the video to extract text; analyzing the extracted text using a natural language processing model to identify domain-specific terminology and ideas unfamiliar to the user.

4. The method of claim 1, wherein analyzing the video to detect choices comprises: performing optical character recognition on the video to extract text; analyzing the extracted text using a natural language processing model to identify user options or choices presented in instructions or user interfaces.

5. The method of claim 1, wherein analyzing the video to detect user sentiment comprises: analyzing audio in the video using a speech recognition model to transcribe spoken words; analyzing the transcribed words using a natural language processing model to detect expressions of positive, negative or neutral sentiment.

6. The method of claim 1, wherein analyzing the video to detect user sentiment comprises: analyzing video of the user's face using a computer vision model to detect facial expressions indicating positive, negative or neutral sentiment.

7. The method of claim 1, further comprising: assigning weightings to the different physical and cognitive effort metrics; calculating an aggregate effort score based on the detected metric values and assigned weightings.

8. The method of claim 1, further comprising: making modifications to a product or workflow associated with the performed task based on the summary report; recording a new video of the user interface after the modifications; analyzing the new video using the effort and sentiment analyzer; generating a new report summarizing the effort metrics for the modified product or workflow; comparing the new report to the previous report to evaluate improvements from the modifications.

9. The method of claim 1, further comprising: filtering or masking, by a client application executing on the computing device, personally identifiable information from at least one of the multi-modal video recording and data collected by an agent installed on the computing device during task performance, to produce anonymized task-performance data; and retraining the artificial intelligence models using the anonymized task-performance data aggregated from a plurality of previously analyzed task performances, to improve detection accuracy over time.

10. The method of claim 1, wherein the plurality of artificial intelligence models includes at least one transformer-based language model pre-trained on a general text corpus and subsequently adapted, by additional training on task-performance text data, to identify domain-specific terminology and choices for a target domain.

11. A system for measuring effort and sentiment, comprising:

a computing device configured to record a multi-modal video recording comprising a synchronized combination of a screen capture of a user interface, audio capture of sounds made by a user, and webcam capture of the user's face and body language while the user performs a task on the computing device;

an effort and sentiment analyzer implemented by one or more servers remote from the computing device, the analyzer comprising:

a physical effort analysis module that analyzes the recorded multi-modal video recording using one or more artificial intelligence models comprising at least one computer-vision model trained to detect visual changes indicative of a physical action to detect and measure physical interaction by the user including clicks, keystrokes, scrolls, and words spoken;

a cognitive effort analysis module that analyzes the recorded multi-modal video recording using a plurality of artificial intelligence models comprising an optical character recognition model that extracts text from the screen capture, a natural language processing model that processes the extracted text, a speech recognition model that transcribes the audio capture, and a multi-modal sentiment fusion model that combines visual features extracted from the webcam capture with textual features derived from at least one of the audio capture and the screen capture to detect and measure cognitive factors including context switches, advanced concepts, choices presented, and user sentiment;

a report generator that generates an interactive summary report of the detected and measured physical and cognitive effort metrics, the interactive summary report including, for each of a plurality of the detected metrics, a timestamp and a link that, when activated, causes playback of the multi-modal video recording to jump to a corresponding point in the multi-modal video recording.

12. The system of claim 11, wherein the computing device has an agent installed that collects physical and cognitive effort data through operating system and application interaction and sends the collected data along with the video to the effort and sentiment analyzer.

13. The system of claim 11, wherein the cognitive effort analysis module identifies advanced concepts by: performing optical character recognition to extract text from the video; analyzing the extracted text using natural language processing to detect domain-specific terminology unfamiliar to the user.

14. The system of claim 11, wherein the cognitive effort analysis module identifies choices presented by: performing optical character recognition to extract text from the video; analyzing the extracted text using natural language processing to detect user options or choices described.

15. The system of claim 11, wherein the cognitive effort analysis module measures user sentiment by: analyzing audio using speech recognition to transcribe spoken words; and analyzing the transcribed text using natural language processing to detect positive, negative or neutral sentiment expressed.

16. The system of claim 11, wherein the cognitive effort analysis module measures user sentiment by: analyzing video of the user's face using computer vision to detect facial expressions indicating positive, negative or neutral sentiment.

17. The system of claim 11, wherein the effort and sentiment analyzer calculates an aggregate effort score by assigning weights to the different physical and cognitive effort metrics and combining the weighted metric values.

18. A non-transitory computer-readable medium storing instructions that, when executed by one or more processors, cause the one or more processors to perform a method for measuring effort and sentiment comprising:

recording a multi-modal video capture of a user interface along with audio and webcam capture while a user performs a task, the multi-modal video capture comprising a synchronized combination of a screen capture of the user interface, an audio capture of sounds made by the user, and a webcam capture of the user's face and body language;

submitting the recorded multi-modal video capture to an effort and sentiment analysis engine implemented on one or more servers remote from the one or more processors;

detecting and measuring physical effort by the user from the multi-modal video capture using one or more artificial intelligence models comprising at least one computer-vision model trained to detect visual changes indicative of a physical action, including number of clicks, keystrokes, scrolls, and words spoken;

detecting and measuring cognitive effort by the user from the multi-modal video capture using a plurality of artificial intelligence models comprising an optical character recognition model, a natural language processing model, a speech recognition model, and a multi-modal sentiment fusion model that combines visual features extracted from the webcam capture with textual features derived from at least one of the audio capture and the screen capture, including number of context switches, advanced concepts presented, choices shown, and expressed user sentiment;

generating an interactive report summarizing the detected and measured physical and cognitive effort expended by the user during the task, the interactive report including, for each of a plurality of the detected metrics, a timestamp and a link that, when activated, causes playback of the multi-modal video capture to jump to a corresponding point in the multi-modal video capture.

19. The non-transitory computer-readable medium of claim 18, wherein the instructions, when executed by the one or more processors, further cause the one or more processors to perform operations comprising: collecting system data regarding physical and cognitive interactions by monitoring an operating system and applications during the task performance; providing the collected system data along with the video to the effort and sentiment analysis engine to enhance analysis accuracy.

20. The non-transitory computer-readable medium of claim 18, wherein detecting advanced concepts comprises using optical character recognition and natural language processing on text extracted from the video to identify domain-specific terminology unfamiliar to the user.

21. The non-transitory computer-readable medium of claim 18, wherein detecting choices comprises using optical character recognition and natural language processing on text extracted from the video to identify options or choices presented to the user.

22. The non-transitory computer-readable medium of claim 18, wherein measuring expressed user sentiment comprises performing speech recognition on audio from the video to transcribe spoken words and performing natural language processing on the transcribed text to detect positive, negative or neutral expressions of sentiment.

* * * * *